(12) United States Patent
Biester

(10) Patent No.: US 8,047,505 B2
(45) Date of Patent: Nov. 1, 2011

(54) REGULATING DEVICE

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 738 days.

(21) Appl. No.: 10/525,926

(22) PCT Filed: Sep. 1, 2003

(86) PCT No.: PCT/EP03/09701
§ 371 (c)(1),
(2), (4) Date: Feb. 25, 2005

(87) PCT Pub. No.: WO2004/020885
PCT Pub. Date: Mar. 11, 2004

(65) Prior Publication Data
US 2006/0006355 A1 Jan. 12, 2006

(30) Foreign Application Priority Data
Aug. 30, 2002 (DE) .................. 202 13 391 U

(51) Int. Cl.
*F16K 31/02* (2006.01)
(52) U.S. Cl. .................. 251/129.11; 251/1.1
(58) Field of Classification Search ............ 251/129.11, 251/129.12, 1.1–1.3; 166/85.4
See application file for complete search history.

(56) References Cited

U.S. PATENT DOCUMENTS

| | | | |
|---|---|---|---|
| 863,180 A | 3/1902 | Howard | |
| 3,159,038 A | 12/1964 | Brown | |
| 3,481,215 A * | 12/1969 | Howell | 74/424.5 |
| 3,998,108 A | 12/1976 | Vyskocil | |
| 4,601,232 A * | 7/1986 | Troxell, Jr. | 251/1.3 |
| 5,195,721 A * | 3/1993 | Akkerman | 251/129.13 |
| 5,370,011 A | 12/1994 | Gilges et al. | |
| 5,722,304 A * | 3/1998 | Allen | 74/586 |
| 5,743,348 A * | 4/1998 | Coppola et al. | 180/65.6 |
| 6,095,487 A * | 8/2000 | Waber | 251/129.11 |
| 6,227,082 B1 * | 5/2001 | Hormansdorfer et al. | 82/1.11 |
| 6,585,246 B2 * | 7/2003 | McCormick et al. | 269/239 |
| 2002/0001580 A1 | 1/2002 | Johansen et al. | |

FOREIGN PATENT DOCUMENTS

DE 36 07 899 10/1987

(Continued)

OTHER PUBLICATIONS

International Search Report for Application No. PCT/EP03/09701 dated Jan. 30, 2004 (3p.).

(Continued)

*Primary Examiner* — John Fristoe, Jr.
*Assistant Examiner* — Andrew J Rost
(74) *Attorney, Agent, or Firm* — Conley Rose, P.C.

(57) ABSTRACT

A regulating device for the linear regulation of an actuating element is connected for movement to a ball spindle drive for the conversion of a rotational movement into a linear movement. The rotational movement can be transferred to the spindle drive from at least one motor via a gear unit. The gear unit exhibits a self-locking, helically toothed spur-wheel gear, which is formed as a double helical gear with at least one first and second spiral-toothed gearwheel. In each case at least one motor is arranged at both ends of the ball spindle drive and each motor is connected for movement with a second spiral-toothed gearwheel.

25 Claims, 1 Drawing Sheet

FOREIGN PATENT DOCUMENTS

| | | |
|---|---|---|
| EP | 0 305 762 | 3/1989 |
| GB | 896896 | 5/1962 |

OTHER PUBLICATIONS

UK Examination Report for Application No. GB0603048.0 dated Jun. 26, 2006; (4 p.).
PCT/EP2003/009696 International Search Report, Jan. 30, 2004 (2 p.).
Office Action for U.S. Appl. No. 10/525,937, Sep. 15, 2008 (13 p.).
Response to Office Action for U.S. Appl. No. 10/525,937, Dec. 15, 2008 (7 p.).
Final Office Action for U.S. Appl. No. 10/525,937, Mar. 12, 2009 (8 p.).
Notice of Appeal for U.S. Appl. No. 10/525,937, Jun. 12, 2009 (1 p.).
Appeal Brief for U.S. Appl. No. 10/525,937, Aug. 12, 2009 (18 p.).
Notice of Non-Compliant Appeal Brief for U.S. Appl. No. 10/525,937, Sep. 8, 2009 (2 p.).
Amended Appeal Brief for U.S. Appl. No. 10/525,937, Sep. 17, 2009 (18 p.).
Notice of Non-Compliant Appeal Brief for U.S. Appl. No. 10/525,937, Dec. 7, 2009 (4 p.).
Amended Appeal Brief for U.S. Appl. No. 10/525,937, Jan. 5, 2010 (19 p.).
U.S. Appl. No. 10/525,937, Mar. 29, 2010 (9 p.).
Reply Brief for U.S. Appl. No. 10/525,937, May 28, 2010 (3 p.).
Reply Brief Entered for U.S. Appl. No. 10/525,937, Jun. 9, 2010 (2 p.).
Board of Patent Appeals and Interferences Docketing Notice, Jun. 24, 2010 (2 p.).

* cited by examiner

REGULATING DEVICE

CROSS-REFERENCE TO RELATED APPLICATIONS

This application is a National Phase entry of PCT Application No. PCT/EP2003/009701 filed 1 Sep. 2003 which claims priority to German Application No. 202 13 391.5 filed 30 Aug. 2002, both of which are incorporated herein by reference. This application is related to the following applications: PCT Application No. PCT/EP2003/009700 filed 1 Sep. 2003 which claims priority to German Application No. 202 13 393.1 filed 30 Aug. 2002; PCT Application No. PCT/EP2003/009698 filed 1 Sep. 2003 which claims priority to German Application No. 202 13 365.6 filed 30 Aug. 2002; PCT Application No. PCT/EP2003/009697 filed 1 Sep. 2003 which claims priority to German Application No. 202 13 389.3 filed 30 Aug. 2002; PCT Application No. PCT/EP2003/009696 filed 1 Sep. 2003 which claims priority to German Application No. 202 13 364.8 filed 30 Aug. 2002; PCT Application No. PCT/EP2003/009699 filed 1 Sep. 2003 which claims priority to German Application No. 202 13 388.5 filed 30 Aug. 2002; and U.S. application Ser. No. 10/836,559 filed 30 Apr. 2004.

STATEMENT REGARDING FEDERALLY SPONSORED RESEARCH OR DEVELOPMENT

Not applicable.

BACKGROUND OF THE INVENTION

The invention relates to a regulating device for the linear regulation of an actuating element which is connected for movement to a gear drive, in particular a ball spindle drive for the conversion of a rotational movement into a linear movement, whereby the rotational movement can be transferred to the spindle drive through a gear unit by at least one motor.

This type of regulating device is known from DE 200 18 569. The known regulating device is used for regulating a shut-off element as an actuating element in a blowout preventer (BOP), whereby a connection channel in the BOP is closed by the shut-off element. The shut-off element is connected for movement with a ball spindle drive. Through this ball spindle drive, a rotational movement produced by a motor is converted into a linear movement for the regulation of the actuating element. In addition, another gear unit, which in DE 200 18 561 is formed by a worm drive, is arranged between the motor and the ball spindle drive.

This regulating device, in particular through the application of the worm drive, is characterized by a self-locking feature and can also otherwise be usefully employed and exhibits substantial advantages compared to other regulating devices without worm drives However, normally the efficiency is limited to less than 50% and the self-locking feature is also generally only available with a high transmission ratio. In addition, with worm drives relatively high axial forces sometimes occur.

With regard to the regulating device in DE 200 18 561, the object of the invention is the improvement of this type of regulating device such that with a simple and compact design an increase in the efficiency for the reduction of the dissipation is possible and also, in particular, high axial forces can be avoided.

SUMMARY OF THE INVENTION

Through the application of a particularly self-locking spur-wheel gear as the gear unit between the motor and the ball spindle drive a very compact design is obtained. In addition, the efficiency of the gear unit is increased to over 50% through the design as spur-wheel gear. Also, only at least reduced axial forces occur due to the appropriate arrangement of the spur-wheel gear.

In a simple embodiment according to the invention the spur-wheel gear has helical teeth.

To retain the advantages of the spur-wheel gear, such as high efficiency, lower transmission ratios, simple construction, parallel axes, etc. and at the same time to simply realize the self-locking or self-braking feature, the spur-wheel gear is formed as a double helical gear. This type of double helical gear exhibits a double helical tooth arrangement and a somewhat screw-shaped appearance. The self-braking feature can, for example, be varied, depending on the helix angle of the double helical gear and its various spiral-toothed gearwheels. This similarly applies to the self-locking, whereby one speaks of self-braking in principle at the drive end and self-locking at the driven end and with the appropriate direction of rotation. Such self-braking and self-locking gears are an advantage, especially for BOPs, because then separate holding/braking equipment is not needed.

This type of double helical gear is characterized by a small size, long service life, high reliability in operation and stable transmission. Furthermore, due to the parallel arrangement of the individual spiral-toothed gearwheels, a compact design is achieved. Double helical gears can be well adapted to different application conditions and also exhibit low noise characteristics.

It should also be pointed out that the regulating device according to the invention is, as well as for use with BOPs, also suitable for other devices with, in particular, a linear regulating actuating element, such as valves, throttles, etc., whereby an appropriate valve, throttle or other component is connected to the actuating element in each case or the actuating element is formed with such a component.

In order to be able to convert the rotational movement into a linear movement in a simple manner, a ball nut on the ball spindle drive can be rotated, but is supported in a housing of the regulating device so that it cannot be moved axially and a rotating spindle of the ball spindle drive is joined to the actuating element. Consequently, when the rotational movement is transferred from the appropriate motor, the ball nut is rotated in a fixed position within the housing and the rotating spindle is therefore in effect pushed in or pushed out. Through the pushing in and pushing out of the rotating spindle the linear adjustment of the rotating spindle occurs in the axial direction which can then be transferred appropriately to the actuating element.

In the simplest case the rotating spindle and the bar-shaped actuating element are arranged one behind the other in the axial direction. Here, the ends of the rotating spindle and actuating element which face one another can in particular be attached to one another in a releasable manner.

A double helical gear exhibits at least one input and output wheel or a first and second spiral-toothed gearwheel which engage one another. According to the invention, the drive or second spiral-toothed gearwheel can be connected to the motor and the output or first spiral-toothed gearwheel can be connected to the ball nut. There is also the possibility that the ball nut is formed in a region of its outer circumference as the output or first spiral-toothed gearwheel.

It should be noted that the efficiency for this type of double helical drive is greater than 65% and even 80% or more is quite possible. In addition, with a double helical gear line contact of the tooth flanks occurs instead of a point contact as with a worm drive.

In order to facilitate a drive for the regulating device independently of complicated feeds for compressed air or any other pressure medium, the motor can be an electric motor. Then there is the possibility of electrifying the complete regulating device together with its controller and monitoring equipment. One example of this type of electric motor is a servomotor or an asynchronous motor.

If high forces are to be exerted by the actuating element and/or redundancy in the operation of the actuating element is to be achieved, it is of advantage if at least one motor is assigned to both ends of the ball spindle drive in each case and each motor is connected for movement to a second spiral-toothed gearwheel, whereby both second spiral-toothed gearwheels engage the first spiral-toothed gearwheel. In this way essentially two ball helical gears are arranged in parallel and at both sides in relation to the ball spindle drive or to the actuating element. Of course, there is also the possibility of arranging more than two double helical gears with an appropriate number of motors.

There is also the possibility that the second spiral-toothed gearwheels do not just engage with one first spiral-toothed gearwheel, but that also two first spiral-toothed gearwheels are connected to the ball nut. Consequently, an offset of the two double helical gears in the axial direction of the ball nut or rotating spindle may be possible.

To further simplify the design of the regulating device and to make it more compact, drive shafts of the motors on both ends can run parallel to one another. Also in this connection the design of the drive shafts and also the motors can use the same types so that a very symmetrical design of the regulating device according to the invention is produced.

High power electric motors may be used so that correspondingly high forces can be transferred over each drive shaft. In order to be able to also use smaller electric motors and to realize redundancy in a simple manner with regard to the electric motors, at least two motors can be arranged on each drive shaft. They can be used simultaneously or individually, especially with the failure of one of the motors.

Electric motors can be easily controlled with regard to their speed so that speeds between, for example, 20 and 8000 rpm can be obtained. In order to realize appropriate reduction of the drive by the motors a reduction gear, in particular a so-called harmonic drive, can be positioned between the drive shaft and the second spiral-toothed gearwheel. With appropriate paired or multiple arrangement of the drive shafts and second spiral-toothed gearwheels, it can also be arranged as a pair or multiple configuration.

The harmonic drive normally comprises three components. These are a fixed or non-rotating component with inner teeth, a flexible, essentially cup-shaped toothed sleeve with outer teeth and a so-called wave generator which rotates in the toothed sleeve. The flexible toothed sleeve is extended at two opposing points by the wave generator such that its outer teeth engage the inner teeth of the ring-shaped, fixed component. Generally, the toothed sleeve exhibits two teeth less than the ring-shaped component so that with one revolution, the relative movement between the toothed sleeve and the ring-shaped component comprises two teeth. According to the invention, there is also, for example, the possibility of connecting the drive shaft to this flexible, cup-shaped toothed sleeve of the harmonic drive for movement.

It has already been pointed out that the tooth arrangement on the double helical gear is a so-called helical gearing and exhibits a certain diagonal angle. Due to the helical position of the teeth there is the possibility of reducing the usual number of teeth. According to the invention, a diagonal angle on the first and/or second spiral-toothed gearwheel in the range of, for example, 50 to 85° can be used. With an appropriately large diagonal angle the number of teeth can be reduced to one tooth.

In contrast, particularly to the worm drive where the self-locking feature is only present for transmission ratios up to a certain lowest transmission ratio, with the double helical gear a transmission ratio lower than 25 and alternatively lower than 1 can be realized without having to relinquish the self-locking or self-braking feature.

To make the regulating device easy to apply, operate and fit, the housing can be formed as a module housing which can be flange-mounted on a control mechanism which is particularly employed in the field of gas and/or oil supply. This module housing can contain all components of the regulating device. The actuating element may be part of the module-type regulating device and protrude from it in the direction of the corresponding control mechanism.

In order to be able to simply assemble all parts of the regulating device and to be able to realize their maintenance or replacement without a great deal of effort, the module housing can comprise a first and a second housing half, whereby the motor and the ball spindle drive are housed in the first half of the housing. Both halves of the housing are preferably joined together in a releasable manner. Depending on the field of application, the module housing can be formed to resist high pressures and high temperatures, etc. It is both suitable for fitting on an appropriate control mechanism externally or for use in such control mechanisms.

To further simplify the construction and the maintenance of the regulating device according to the invention, an intermediate cover for at least supporting the second spiral-toothed gearwheels at one end can be arranged within the module housing.

For the simple monitoring of the regulating device it can exhibit a position sensor to enable the position of the actuating element to be measured. There is the possibility of arranging such a position sensor on the intermediate cover for the acquisition of the position of the rotating spindle and/or ball nut. The position of the actuating element can also be acquired via the position of the rotating spindle or the ball nut.

In order to be able to connect the first spiral-toothed gearwheel rotationally immovable to the ball nut without additional components, the first spiral-toothed gearwheel can in particular be releasably fitted to an end of the ball nut facing away from the actuating element.

In this connection it may be regarded as favorable if an intermediate ring, which can in particular be screwed onto the outside of the ball nut, is arranged between the ball nut and the first spiral-toothed gearwheel. In this way, the ball nut only needs to be formed for the fitting of the appropriate intermediate ring, whereby the intermediate ring can compensate for differing dimensions between the ball nut and the first spiral-toothed gearwheel. Consequently, there is the possibility of using both commercially available ball spindle drives as well as commercially available double helical gears and compensating corresponding differences using the intermediate ring.

To fix the ball nut in a simple manner against displacement in the axial direction and at the same time to ensure its rotation, the ball nut can be held immovably in the axial direction by pivot bearings and a retention ring mounted as required releasably in the housing.

A rotation of the actuating element relative to the regulating device can be prevented in various ways. The actuating element may exhibit an appropriate cross-section, such as triangular, square or similar, which is formed to complement an appropriate hole in the housing of the regulating device. Furthermore, the actuating element may be supported in the corresponding control mechanism in a manner such that it cannot be rotated. In order to prevent rotation also with a simple form of the actuating element or of the rotating spindle, the actuating element and/or the rotating spindle can be supported rotationally rigidly in the housing, in particular by using a splined shaft.

If two or more electric motors are used, especially for simultaneously moving the actuating element, these electric motors can be synchronized. The synchronization can occur electronically, for example, in that one electric motor is used as master and the others as slaves.

Apart from the direct electronic synchronization of the electric motors, also the drive shafts may be synchronized mechanically. This can, for example, occur using a mechanical coupling device with toothed wheels, toothed belt, chain or similar. In this case for example, on each of the drive shafts a toothed wheel is arranged which engages a toothed wheel in the device housing and a chain or toothed belt couples the two toothed wheels or a set of gearwheels can be provided which synchronize the various drive shafts mechanically. Through this mechanical synchronization or coupling of the various drive shafts there is also the possibility that only one of the drive shafts is driven by appropriate motors and the drive power is transferred to the other drive shafts via the mechanical coupling device. Furthermore, in this connection a self-braking or self-locking gear unit between the rotating spindle and each drive shaft can be omitted, because the self-braking or self-locking feature can also be transferred via the mechanical coupling device. This means that it is sufficient to arrange one self-braking or self-locking gear unit between the spindle and a drive shaft.

It is also pointed out that the regulating device according to the invention can, with appropriate design of the mechanical coupling device, also be formed without self-locking gear units between the spindle and one of the drive shafts. By coupling all drive shafts mechanically together, a certain measure of self-braking or self-locking is also produced. The spindle of the regulating device may be connected to the mechanical coupling device for movement, so that with the complete omission of further gear units between the rotating spindle and one of the drive shafts, a rotational movement on the rotating spindle is transferred via the mechanical coupling device. In addition, a simple non-self-locking or non-self-braking gear unit may be arranged between only one drive shaft and the rotating spindle in addition to the mechanical coupling device. Clearly, there are also other combinations of these appropriate components.

For the simple construction of the double helical gear, the first and second spiral-toothed gearwheels can exhibit 1 to 10, preferably 1 to 7 and especially preferably 1 to 4 teeth, whereby reduction ratios in the range from 1:5 to 1:100 of the regulating device according to the invention are generally required.

In the following an advantageous embodiment of the invention is explained based on the FIGURE enclosed in the drawing.

DETAILED DESCRIPTION OF THE PREFERRED EMBODIMENTS

Figure 1:
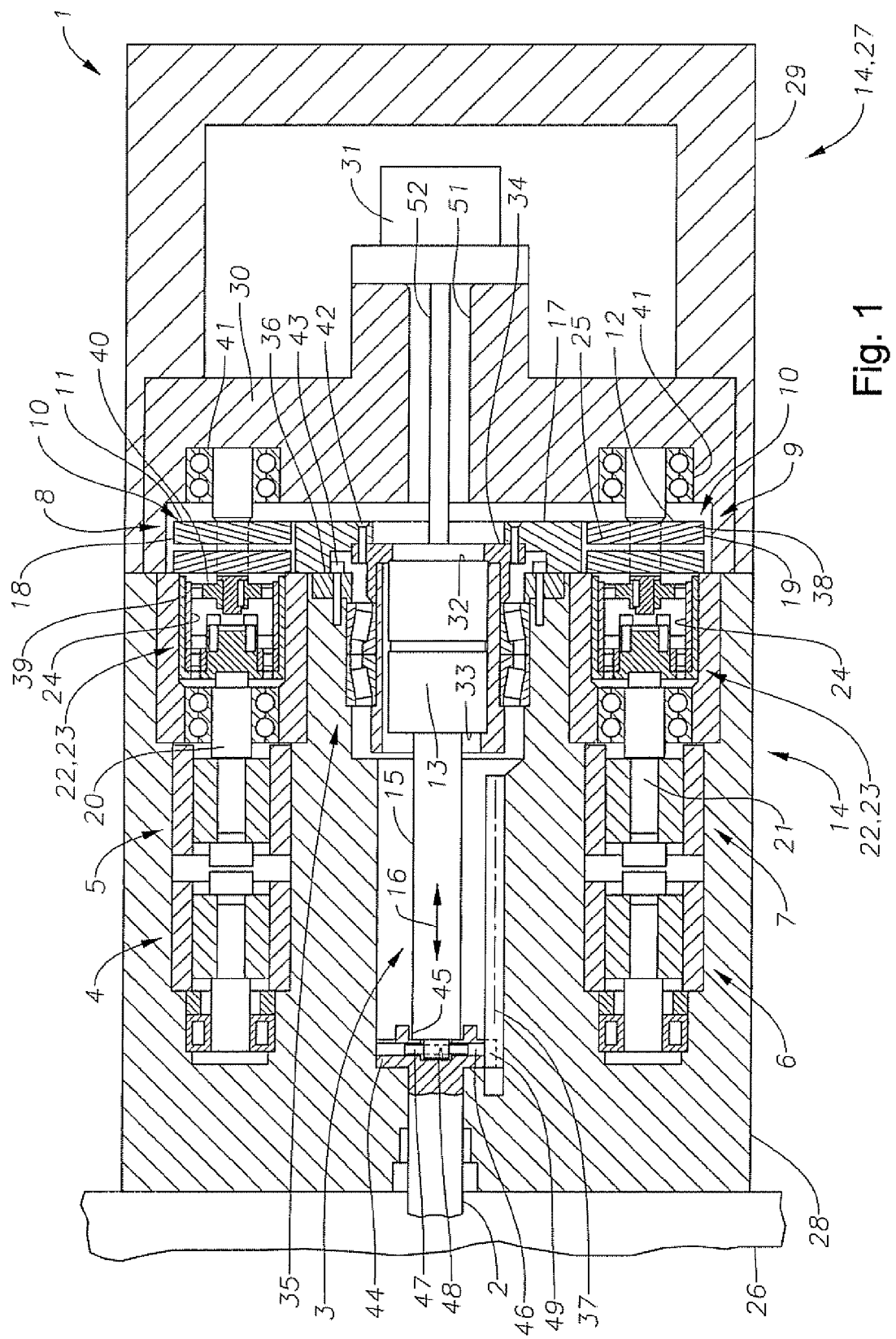
FIG. 1 shows a longitudinal section through an embodiment of a regulating device according to the invention.

The regulating device 1 of FIG. 1 exhibits a housing 14 formed as a module housing 27, the said housing being able to be flange-mounted in a manner not shown in any further detail on an only partially depicted control mechanism 26 or it can be at least partially inserted in the said control mechanism. The module housing 27 exhibits a first housing half 28 and a second housing half 29. These can, for example, be fastened together releasably by screws or similar. Between the two housing halves 28, 29, an intermediate cover 30 is arranged which is held in a positive locking manner by the two housing halves 28 and 29 in their assembled state. The intermediate cover 30 exhibits essentially centrally a hole 51 through which a probe element 52 extends as part of a position sensor 31. Using the probe element 52, movement of a rotating spindle 15 of a ball spindle drive 3 in the axial direction 16 or in the linear direction can be acquired. The rotating spindle 15 can be adjusted between an extended position illustrated in FIG. 1 and a withdrawal position moved to the right in FIG. 1 using the ball nut 13 which can be rotated, but is fixed in the axial direction. At its end facing away from the ball nut 13, the rotating spindle 15 is inserted in a recess 45 of a connecting head 44 of an actuating element 2. The actuating element 2 and the rotating spindle 15 are both arranged in the axial direction, whereby on an end of the actuating element 2, not shown in FIG. 1, an appropriate actuating appliance for adjusting a valve, for closing a channel in a BOP or similar, is arranged.

The connecting head 44 exhibits a transverse hole 46 running transverse to the axial direction, in which, through an insertion recess 45, a tip of the spindle 15 is arranged with a split-pin location hole 48 running coaxially to the transverse hole 46. A split pin 47 for the releasable fastening of the actuating element 2 and the rotating spindle 15 is arranged in the split-pin location hole 48, protruding from both ends of the said hole.

On one side the connecting head 44 exhibits an overlap 49 which at least partially surrounds a splined shaft 37. Due to this said shaft, the connecting head 44 and therefore the actuating element 2 and the rotating spindle 15 are held rotationally rigidly in the module housing 27.

The ball nut 13 exhibits an end 33 facing the actuating element 2 and an end 32 facing away from it. The ball nut 13 can be rotated in the module housing 27, but is axially fixed by the pivot bearing 35 and is held by a retention ring 36 mounted releasably in the module housing. The ball nut 13 and an interior wall of the module housing 27 located opposite it exhibit a recess in which pivot bearings 35 are located, which are formed as angular roller bearings. The recess in the inner wall of the module housing is bounded at one end by the retention ring 36. This is fitted releasably to the module housing by the screwed bolts 43.

At the end 32 an intermediate ring 34 is screwed by screw 42 onto the ball nut 13. This protrudes in the radial direction outwards beyond the ball nut, whereby in this region as gear units 8, 9 a first spiral-toothed gearwheel 17 or a driven gear 17 of a spurwheel drive 10 formed as a double helical gear 11, 12 is releasably mounted. There are a total of two double helical gears 11, 12 arranged, whereby the first spiral-toothed gearwheel 17 is associated with both double helical gears, each of which also exhibits a second spiral-toothed gearwheel 18, 19. Suitable helical tooth arrangements of the spiral-toothed gearwheels 17, 18, 19 engage one another. The helical tooth arrangement of the various spiral-toothed gearwheels is formed e.g. by teeth 38 arranged at a diagonal angle 25.

The second spiral-toothed gearwheels 18, 19 are supported for rotation at one end using pivot bearings 41 in recesses in the intermediate cover 30. On their ends opposite the pivot bearings 41 the spiral-toothed gearwheels 18, 19 are rotationally rigidly connected to a wave generator 40 of a reduction gear 22 formed by a harmonic drive 23. The wave generator 40 presses two oppositely positioned regions of a flexible, cup-shaped toothed sleeve 24 outwards. The toothed sleeve 24 exhibits an outer tooth arrangement which engages an inner tooth arrangement on a fixed ring element 39 on these oppositely positioned regions. The toothed sleeve 24 and the ring element 39 are further parts of the harmonic drive 23.

The toothed sleeve 24 is rotationally rigidly connected to a drive shaft 20, whereby two electric motors 4, 5 are arranged on this drive shaft 20.

A similar arrangement applies to the drive shaft 21, which is also rotationally rigidly connected to a corresponding toothed sleeve 24 and which exhibits two electric motors 6, 7. The harmonic drive 23 which is connected to the drive shaft 21 is constructed similar to the other harmonic drive 23, refer to drive shaft 20, so that the complete arrangement or construction of the corresponding drive chains is symmetrical at both ends parallel to the rotating spindle 15.

The electric motors 4, 5 or 6, 7 can be used both simultaneously as well as alternatively for the drive of the drive shaft 20, 21 and therefore for the rotation of the ball nut 13 via the double helical gears 11, 12, whereby the double helical gears 11, 12 are each formed by the first spiral-toothed gearwheel 17 and the second spiral-toothed gearwheel 18 or the second spiral-toothed gearwheel 19.

With simultaneous operation the electric motors 4, 5 and 6, 7 are synchronized electronically.

With a further embodiment, of the invention synchronization of the rotational movement of the drive shaft 20, 21 occurs via a mechanical coupling device 53. This exhibits, for example, a pinion 54 on each of the drive shafts and a chain 55 linking the various pinions together for movement. Instead of a chain, a toothed belt or also a gearwheel supported in the housing 14 can be used which engages all the pinions. In addition, with a further embodiment, the pinion and chain or toothed belt can be substituted by a set of gearwheels.

It should also be pointed out that a certain self-braking or self-locking of the rotational movements of the various drive shafts 20, 21 is provided due to the mechanical coupling device 53, so that with a further embodiment of the invention, self-braking or self-locking gear units between the drive shafts 20, 21 and rotating spindle 15 can be omitted. This means that the double helical gears 11, 12 can be left out or replaced by only one double helical gear. Furthermore, there is the possibility that only one of the drive shafts 20, 21 is driven by appropriate electric motors and the rotational movement can be transferred to all other drive shafts via the mechanical coupling device 53.

It will be realized of course that the above embodiment can also apply to more than two drive shafts.

In the following the operating principle of the regulating device 1 according to the invention is briefly described based on the FIGURE.

With the actuation of the motors 4, 5 and 6, 7 the drive shafts 20 and 21 are correspondingly rotated. An initial reduction of the rotation occurs through the harmonic drives 23 as reduction gears 22. A further reduction then occurs due to the double helical gears 11, 12. Here, this type of double helical gear can exhibit just a few teeth, for example, ten or fewer teeth or in the extreme case only one tooth on one of the spiral-toothed gearwheels.

The first spiral-toothed gearwheel associated with both double helical gears 11, 12 is connected to the ball nut 13, whereby its rotation, transferred from the electric motors 4, 5 and 6, 7 by the double helical gears 11, 12 and the harmonic drives 23, is converted into an axial displacement or a linear movement of the rotating spindle 15. In FIG. 1 the rotating spindle 15 is illustrated in its maximum extended position in which the actuating element 2 releasably connected to the rotating spindle 15 is displaced as far as possible towards the left in FIG. 1. The displacement of the rotating spindle 15 can be acquired by the position sensor 31 so that a corresponding displacement of the actuating element 2 is known at all times.

Due to the application of the double helical gears 11, 12 a self-locking or self-braking feature as well as a high efficiency is provided with low dissipation. The corresponding tooth flanks of the teeth 38 of the first and each of the second spiral-toothed gearwheels of the double helical gears 11, 12 are in linear contact. Due to the parallel arrangement of the corresponding spiral-toothed gearwheels essentially no axial forces occur and overall a very simple form of construction is used. Furthermore, this type of double helical gear is relatively low noise, compact in construction and exhibits a long service life.

The invention claimed is:

1. A subsea regulating device for the linear regulation for a shut-off element of a subsea well blowout preventer comprising:
   a housing attached to the subsea well blowout preventer;
   a drive train comprising:
      at least one motor;
      a self-locking, double helical gear comprising at least one first helically-toothed gearwheel and at least one second helically-toothed gearwheel;
      a reduction gear arranged between the at least one motor and the at least one second helically-toothed gearwheel;
      whereby the at least one motor is connected for movement with the at least one second helically-toothed gearwheel; and
   a ball spindle drive coupled with the drive train within the housing comprising:
      a rotating spindle; and
      a ball nut surrounding the spindle;
   wherein the ball nut of the ball spindle drive is supported rotationally but axially immovable such that operation of the drive train rotates the ball nut to adjust the spindle linearly in an axial direction; and
   wherein the spindle is connected for movement to the shut-off element such that linear adjustment of the spindle is transferred to linear adjustment of the shut-off element.

2. Subsea regulating device according to claim 1, characterized in that the rotating spindle and the shut-off element are arranged one behind the other in the axial direction.

3. Subsea regulating device according to claim 1, characterized in that the ball nut is connected to the first helically-toothed gearwheel and the at least one motor to the at least one second helically-toothed gearwheel of the self-locking, double helical gear.

4. Subsea regulating device according to claim 1, characterized in that the at least one motor is an electric motor.

5. Subsea regulating device according to claim 1, further comprising two motors, each driving a second helically-toothed gearwheel, both second helically-toothed gearwheels engaging the first round helically-toothed gearwheel.

6. Subsea regulating device according to claim 5, the drive train further comprising drive shafts driven by the motors and extending parallel to one another.

7. Subsea regulating device according to claim 5, further comprising at least two motors are arranged on each drive shaft.

8. Subsea regulating device according to claim 6, characterized in that the drive shafts are synchronised in their rotational movements using a mechanical coupling device.

9. Subsea regulating device according to claim 5, characterized in that the electric motors are synchronized.

10. Subsea regulating device according to claim 1, the drive train further comprising:
 a harmonic drive comprising a flexible, cup-shaped toothed sleeve; and
 a drive shaft driven by the at least one motor and connected for movement with the flexible, cup-shaped toothed sleeve.

11. Subsea regulating device according to claim 1, characterized in that a diagonal angle of the helical gearing of the at least one first and/or the at least one second helically-toothed gearwheel is in the range from 50 to 90°.

12. Subsea regulating device according to one-claim 1, characterized in that the double helical gear has a transmission ratio lower than 25.

13. Subsea regulating device according to claim 1, wherein the housing can be flange-mounted on a control mechanism.

14. Subsea regulating device according to claim 1, the housing comprising a first and second housing half with the at least one motor and the ball spindle drive located in the first housing half.

15. Subsea regulating device according to claim 1, further comprising an intermediate cover arranged within the housing for at least single-ended support of the at least one second helically-toothed gearwheel.

16. Subsea regulating device according to claim 15, further comprising a position sensor arranged on the intermediate cover and capable of the acquisition of the position of the rotating spindle and/or the ball nut.

17. Subsea regulating device according to claim 1, characterized in that the at least one first helically-toothed gearwheel is releasably mounted on an end of the ball nut facing away from the shut-off element.

18. Subsea regulating device according to claim 1, the ball spindle drive further comprising an intermediate ring attached externally onto the ball nut between the ball nut and the at least one first helically-toothed gearwheel.

19. Subsea regulating device according to claim 1, the ball spindle drive further comprising pivot bearings and a retention ring releasably mounted in the housing, the pivot bearings and retention ring holding the ball nut immovable in the axial direction.

20. Subsea regulating device according to claim 1, characterized in that the shut-off element and/or the rotating spindle are supported rotationally rigidly in the housing a splined shaft.

21. Subsea regulating device according to claim 1, characterized in that the first and second helically-toothed gearwheels exhibit 1 to 10 teeth.

22. Subsea regulating device according to claim 21 wherein the first and second helically-toothed gearwheels have 1 to 7 teeth.

23. Subsea regulating device according to claim 21 wherein the first and second helically-toothed gearwheels have 1 to 4 teeth.

24. Subsea regulating device according to claim 1 wherein the reduction gear is a harmonic drive.

25. Subsea regulating device according to claim 1, characterized in that a diagonal angle of the helical gearing of the at least one first and/or the at least one second helically-toothed gearwheel is in the range from 65 to 85°.

* * * * *